Aug. 14, 1928.  1,680,871

J. W. GARDNER

LUBRICATING MECHANISM

Filed July 13, 1926   2 Sheets-Sheet 1

John W. Gardner, Inventor

By Horace L. ....

Attorney

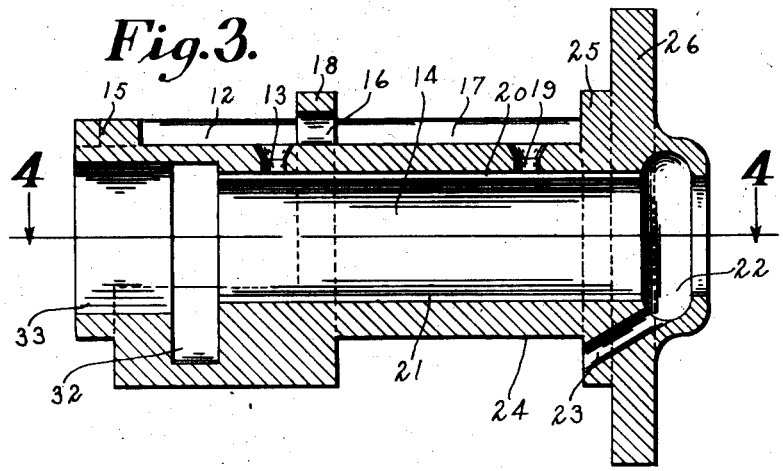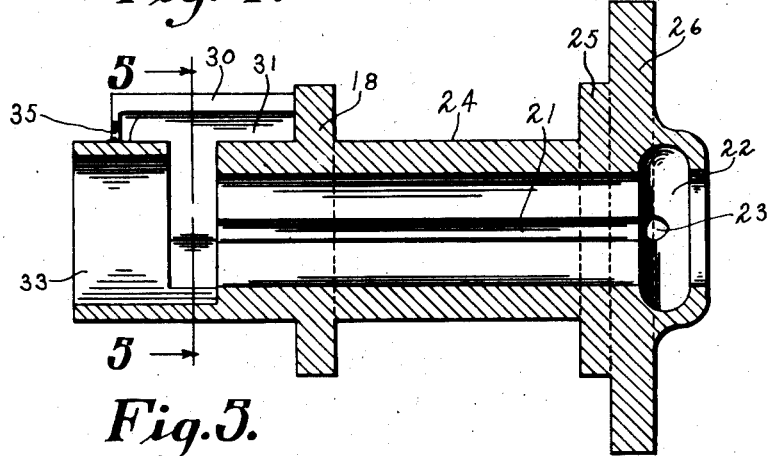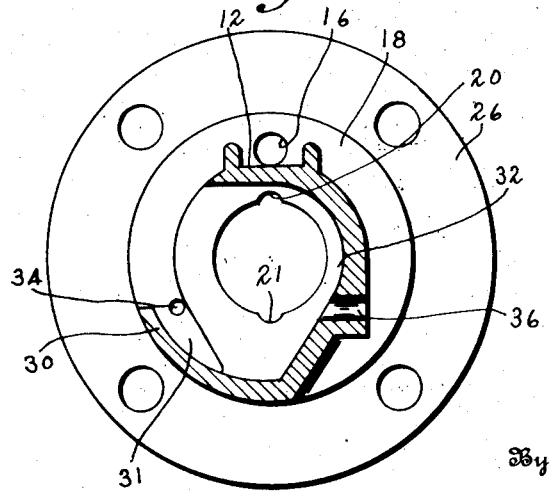

Patented Aug. 14, 1928.

1,680,871

UNITED STATES PATENT OFFICE.

JOHN W. GARDNER, OF QUINCY, ILLINOIS, ASSIGNOR, BY MESNE ASSIGNMENTS, TO GARDNER-DENVER COMPANY, A CORPORATION OF DELAWARE.

LUBRICATING MECHANISM.

Application filed July 13, 1926. Serial No. 122,237.

My invention relates to lubricating mechanisms.

It has for its object to provide an improved lubricating mechanism, and more particularly such a mechanism of the type wherein the supply of lubricant is derived from rotating mechanism, one element of which rotates in a lubricant bath. A further object of my invention is to provide an improved mechanism of the type described and claimed in my co-pending applications Serial Nos. 707,255, filed Apr. 17, 1924, and 725,521, filed July 11, 1924, wherein, through an improved construction and arrangement of parts and lubricating passages, an improved distribution and a larger supply of lubricant to the several bearings is effected. A still further object of my invention is to provide an improved lubricating slip bearing having an improved arrangement of lubricant collecting and distributing means thereon whereby lubricant may be collected from rotating parts and distributed in an improved manner. These and other objects and advantages of my improved construction will, however, hereinafter more fully appear.

In the accompanying drawings I have shown for purposes of illustration one embodiment which my invention may assume in practice, illustrating the same in connection with a pump.

In these drawings,—

Fig. 3 is a central longitudinal section on line 3—3 of Fig. 2;

Fig. 4 is a longitudinal section on line 4—4 of Fig. 3; and

Fig. 5 is a transverse section on line 5—5 of Fig. 4.

Figure 1:
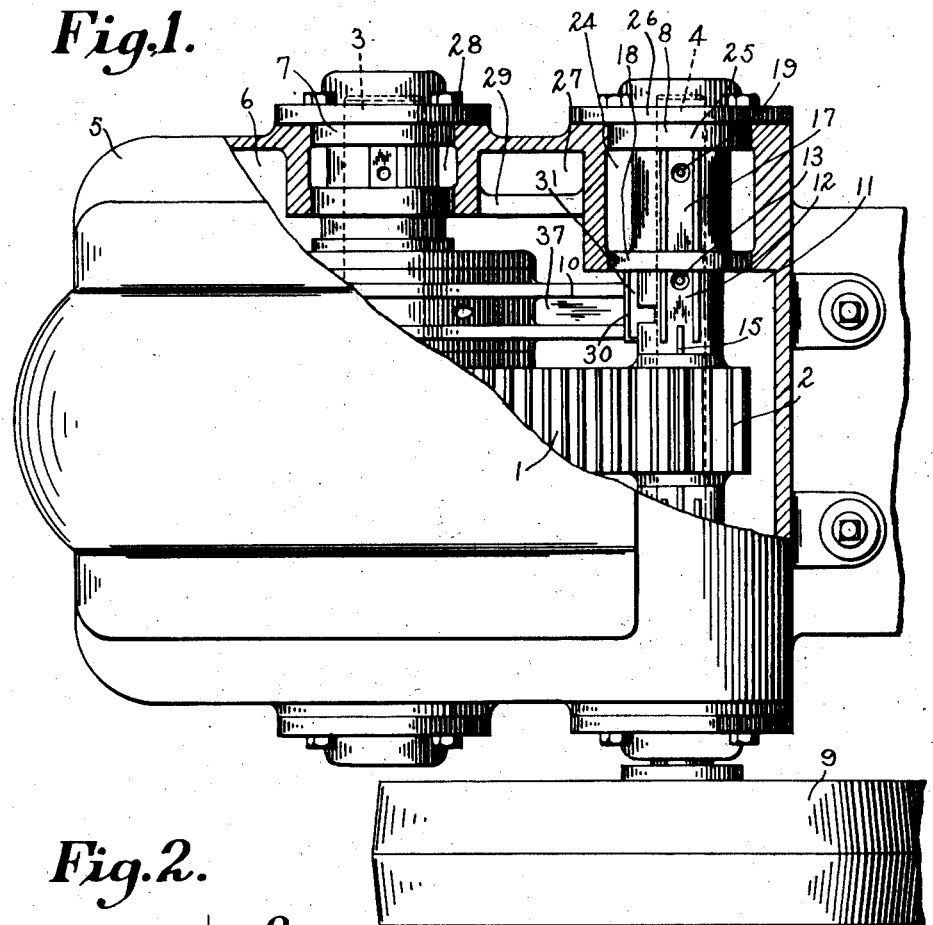
Fig. 1 is a plan view partially in section showing my invention applied to a pump, the power end of the pump only being shown to facilitate illustration.
Figure 2:
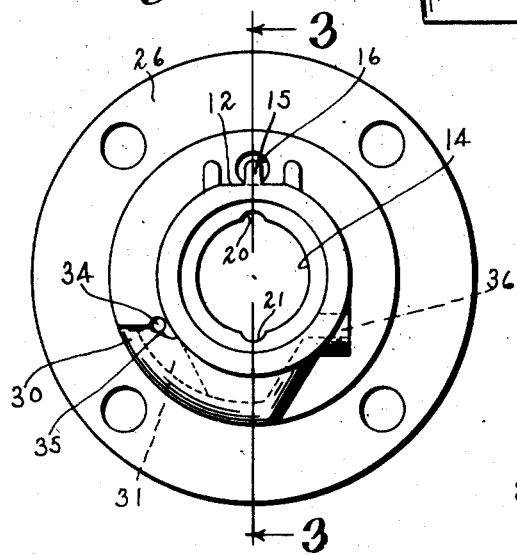
Fig. 2 is an end elevation of the bearing.

In this illustrative construction, I have shown a duplex pump of the general type described and claimed in my above mentioned applications and equipped with generally similar lubricating means, improved as hereinafter brought out. It comprises herein a large main gear 1 and an upper cooperating driving pinion 2 therefor, both being carried on suitable shafts 3, 4 journaled in a casing 5 having a lubricant reservoir 6 in its bottom, into which dips only the main gear 1. Moreover, the ends of the shafts 3, 4, shown in dotted lines in Fig. 1, are carried in suitable slip bearings 7 and 8, and are supplied automatically with lubricant from the reservoir 6 through these bearings, as hereinafter more particularly described. Further, when power is supplied to a pulley 9 to rotate the pinion 2 and the main gear 1, suitable connecting rods 10, connected to the latter, are caused to be automatically lubricated when they are operated to reciprocate the pump crossheads, not shown, in a usual manner while the crossheads are also automatically lubricated from the jack shaft bearings 8 through reservoir means 11, all in the general manner described in my earlier applications.

In my improved construction it will be noted that, while each bearing 7 is the same as in my previous cases, each jack shaft bearing 8 is improved. Herein, each bearing 8 is provided on its top with an improved longitudinally extending slot or chamber 12 having upstanding walls, or ribs forming walls, extending to its inner end. This chamber also has an open inner end adjacent the pinion 2 and an oil hole 13 intermediate its ends, leading downward to the bore 14 of the bearing member in which the jack shaft is carried. Moreover, it will be noted that midway between the side walls of this chamber 12, and at one end of the same, a short upstanding longitudinally extending abutment or wiper 15 is provided which projects upward from the flat bottom of the chamber 12. Herein this wiper 15 extends out beyond the ends of the walls of the chamber and into a relatively close fit with the adjacent side of the hub of the pinion 2, which herein is of substantially the same diameter as the inner end of the body of the member 8. Thus, it will be noted that, since the member 15 is disposed at the end of the hub and also extends above it, lubricant flowing down from the pinion 2, whatever the direction of rotation or the speed of the latter, will engage this member 15 and be wiped off and deflected thereby longitudinally into the chamber 12 and its oil hole 13. It will also be noted that the chamber 12 herein has a passage 16 connecting it with a corresponding chamber 17 forming a continuation of the chamber 12 and likewise formed on the top of the bearing but on the opposite side of an annular flange 18, and that this chamber 17 extends substantially to the outer end of the bearing and near that end has a similar oil hole 19 leading into the bore 14. Thus, it will be observed that lubricant collected from the pinion 2 will be delivered to both of the oil holes 13 and 19 so that a constant supply will be delivered to longitudinal lubricant grooves 20, 21 in the bore of the bearing 8. Attention is also directed to the fact that any excess lubricant traveling out along the end of the shaft will be collected in a suitable annular open ended chamber 22 at the outer end of the bore of the bearing 8 and delivered through a downwardly extending passage 23 therein to an annular space 24 between the flange 18 and a corresponding flange 25 on the outer end of the bearing and just inside the usual outer clamping flange 26 thereon, the passage 23 herein extending through the flange 25 as heretofore. Thus, lubricant may be supplied from the chambers 12 and 17 and from this annular space 24 through a connecting passage means 27 to a corresponding annular space 28 on the bearing 7 and supply that bearing as described in my previously mentioned applications, the excess also returning to the reservoir 6 through a lateral overflow 29, as therein set forth, and some also returning to the bath through the inner ends of the bearings.

Here attention is also directed to that fact that on the side of the bearing and in a plane below the chamber 12, and herein also, as preferably, approximately level with the bottom of the bore 14, I have provided an underslung lip 30 forming a trough or chamber 31 extending below the bore and longitudinally from near the pinion 2 to the flange 18 and disposed within the outer diameter of the latter. It will also be noted that I have further cut away transversely, as by slotting, a communicating higher cutaway portion 32, so that an inlet is provided leading from and above the chamber 31 directly to the shaft, this space also entirely surrounding the shaft and joining with the chamber 31 at its bottom, all as shown in Fig. 5. As illustrated in Figs. 3 and 4, the inner end of the bore 14 is also enlarged at 33 at one side of this opening 32, the length of the bearing surface being thereby reduced in such manner as to simplify and cheapen manufacture. Thus, the lubricant which in the normal operation of the device will be squeezed out between the teeth of the gears 1 and 2 is caught in the lip 30 and in the chambers 31, 32 and enabled to pass freely to the jack shaft and lubricate the latter as necessary, as it rotates, while that supplied from the troughs 12 and 17 also passes to the shaft; the shaft thus, in effect, rotating in a lubricant bath. Moreover, it will be noted that at the outer end of the chamber 31 and adjacent the top thereof, I have provided an oil hole 34 extending through the flange 18 and communicating with the annular space 24, so that an additional quantity of lubricant may be supplied to the latter to augment the flow to the bearing 7 through the passage 27. At the opposite end of the chamber 30 I have also cut away the inner wall of the lip as shown at 35, to facilitate lubricant flow. It will further be observed that at the rear of the slot or space 32 I have also provided a passage 36 adapted to supply lubricant to the reservoir means 11, and from it to the rearward extensions thereof, indicated in Fig. 1, and therethrough to the crossheads in the manner heretofore described. It will further be evident that the excess lubricant not falling into the lip 30 and chamber 31 will be free to fall into longitudinal chambers or grooves 37 in the upper surface of the connecting rods 10 and thereby be supplied to the connecting rod bearings as previously described.

In the normal operation of my improved construction, the lubricant carried up by the gear 1, as it rotates in the oil bath 6, will be squeezed out between the teeth of that gear and the pinion 2. Hence, some will fall into the trough 31 and passage 32 in either direction of rotation of the gearing as described in my previous application. However, lubricant will also drain down from the upper teeth of the pinion 2 and the wiper 15 will act to wipe this lubricant from the pinion as the latter rotates in either direction, and thus divert additional lubricant into the chamber 12. Thus, two large supplies of lubricant are obtained, one squeezed from between the teeth of the gear 1 and pinion 2 and the other wiped from the pinion 2 and both serving both main and jack shaft bearings. From the first of these supplies, the lubricant is herein transmitted directly and in large volume to the jack shaft through the chamber 31 and passage 32 so that the the end of the shaft extending through the bearing 8 in effect rotates in a lubricant bath. Moreover, some of this lubricant will find its way lengthwise of the shaft to the chamber 22 in the end of the jack shaft bearing member 8, and from that through the passage 23, into the annular chamber 24, through the frame passage 27, and to the annular chamber 28 surrounding and supplying lubricant to the bearing 7 of the main shaft. More lubricant is also delivered from this supply to the annular chamber 24 through the port 34 from the chamber 31, the supply through the passage 32 and the port 34 thus forming two outlets from the trough 31. The other supply of lubricant to the bearings is delivered to the chamber 12 and from that to the jack shaft through the oil hole 13, the port 16 and the oil hole 19; the excess from this supply also finding its way to the portion 33 through the bearing bore and from the latter also to the main shaft bearing through the annular space 24, as previously described. At the same time, lubricant will be supplied from the chamber 32 through the passage 36 to the reservoir 11 and the crossheads, while the overflow from the trough 30 will pass to the longitudinally grooved connecting rod 10 to lubricate the bearings of the latter.

Thus it will be observed that each of the bearings is flooded with lubricant, and that a plurality of supplies of lubricant are supplied to both the jack shaft bearing and the main shaft bearing, the several supplies serving to supplement one another or alone supply lubricant to the necessary parts should the other supply be rendered ineffective for any reason, as when through lack of care or the use of an improper lubricant certain of the apertures are permitted to become clogged. Attention is also directed to the fact that through the use of the member 15, a positive supply of lubricant is provided, not only to the bearings of the jack shaft, but to the bearings of the main shaft, irrespective of the direction of rotation of the pump or of the speed of operation thereof. More particularly, the member 15 wipes off oil from the side of the pinion 2 and diverts it to the lubrication of both bearings, irrespective of the direction of rotation of the pinion, the member 15 functioning in either direction of rotation of the gearing to render an additional amount of lubricant available. Further, it also wipes off lubricant and diverts it for these same purposes even when the pump is operated at extremely low speeds and when in one direction of slow speed rotation the supply to the trough 30 is reduced. Thus it will be noted what this member 15 with its connected mechanism serves to embody in the lubricating system an additional positive feed which, while normally functioning with the other lubricating devices to supplement the flow to the jack and main shaft bearings, is also capable of supplementing the flow despite change in the direction of rotation or the speed of rotation, this positive feed also being operative to supply both sets of bearings irrespective of whether the supply from the other distributing means may become reduced or even interrupted. Attention is also directed to the fact that this member 15 is so carried by the slip bearing 8 as to permit the withdrawal of the latter without the necessity of disconnecting the wiper. These and other advantages of my improved construction will however, be clearly apparent to those skilled in the art.

While I have in this application specifically described one form which my invention may assume in practice, it will be understood that the invention is not limited thereto but may be modified and embodied in various other forms without departing from the spirit of the invention or the scope of the appended claims.

What I claim as new and desire to secure by Letters Patent is:

1. In a lubricating mechanism, a gear dipping into a lubricant bath, a non-dipping gear meshing therewith, a plurality of bearings for each of said gears, means collecting lubricant on said non-dipping gear in either direction of rotation of the latter, and means for supplying lubricant collected thereby to all of said bearings.

2. In a lubricating mechanism, a gear dipping in a lubricant bath, a non-dipping gear meshing therewith, bearings for said gears, a deflector collecting lubricant from said non-dipping gear in either direction of rotation thereof, and means for supplying lubricant collected thereby to both of said bearings.

3. In a lubricating mechanism, a gear dipping in a lubricant bath, a non-dipping gear meshing therewith, shafts for said gears, and lubricating means for said shafts including an upright wiper collecting lubricant from said non-dipping gear in either direction of rotation thereof and operative connections supplying the same to both shafts.

4. In a lubricating mechanism, a gear dipping in a lubricant bath, a non-dipping gear meshing therewith, shafts for said gears, and lubricating means for supplying to both of said shafts lubricant carried up by said dipping gear including a deflector acting on lubricant on said non-dipping gear operative to supply lubricant therefrom to the shaft of the non-dipping gear in either direction of rotation of said gear.

5. In a lubricating device, a gear dipping in a lubricant bath, a non-dipping gear meshing therewith, shafts therefor, and bearing lubricating devices for both shafts including means for collecting and distributing lubricant squeezed from between the teeth of said gears and deflector means collecting and delivering to said first mentioned means lubricant from the non-dipping gear in either direction of the latter.

6. In a lubricating device, a gear dipping in a lubricant bath, a non-dipping gear meshing therewith, shafts therefor, means for collecting and supplying to the bearings of both shafts lubricant carried up by the dipping gear, and cooperating means for collecting and supplying to one of said bearings lubricant from the non-dipping gear irrespective of the direction of rotation of the latter.

7. In a lubricating device, a gear dipping in a lubricant bath, a non-dipping gear meshing therewith, shafts therefor, means for collecting and supplying to a bearing of one shaft lubricant carried up by the dipping gear, and cooperating means for collecting and supplying to the bearings of both shafts lubricant from the non-dipping gear irrespective of the direction of rotation of the latter.

8. In a lubricating device, a gear dipping in a lubricant bath, a non-dipping gear meshing therewith, shafts therefor, means for collecting and supplying lubricant squeezed from between the teeth of said gears to a bearing of one shaft, and cooperating means for collecting and supplying to a bearing of the other shaft lubricant on the non-dipping gear in either direction of rotation of the latter.

9. In a lubricating device, a gear dipping in a lubricant bath, a non-dipping gear meshing therewith, shafts therefor, means for collecting and supplying lubricant squeezed from between the teeth of said gears to the bearings of each shaft, and cooperating means for collecting and supplying to the bearings of one shaft lubricant on the non-dipping gear in either direction of rotation of the latter.

10. In a lubricating device, a gear dipping in a lubricant bath, a non-dipping gear meshing therewith, shafts therefor, means for collecting and supplying lubricant squeezed from between the teeth of said gears to the bearings of one shaft, and cooperating means for collecting and supplying to the bearings of each shaft lubricant on the non-dipping gear in either direction of rotation of the latter.

11. In a lubricating device, a gear dipping in a lubricant bath, a non-dipping gear meshing therewith, shafts therefor, means for collecting and supplying lubricant squeezed from between the teeth of said gears to the bearings of each shaft, and cooperating means for collecting and supplying to the bearings of each shaft lubricant on the non-dipping gear in either direction of rotation of the latter.

12. In a lubricating device, a gear dipping in a lubricant bath, a non-dipping gear meshing therewith, shafts therefor, means for collecting and supplying lubricant squeezed from between the teeth of said gears to a bearing of one shaft, cooperating means for collecting and supplying to a bearing of the other shaft lubricant on the non-dipping gear irrespective of the direction of rotation of the latter, and intercommunicating passage means between said supply means.

13. In combination, meshing gearing including a gear dipping in a lubricant bath and a meshing pinion, shafts for said gearing, bearings for said shafts, and means for supplying to each of said bearings both lubricant squeezed from between the teeth of said gears and lubricant draining from said pinion including separate means for collecting different supplies and each receiving lubricant irrespective of the direction of rotation of said gearing.

14. In combination; meshing gearing including a gear dipping in a lubricant bath and a meshing pinion, shafts for said gearing, bearings for said shafts, means for collecting lubricant squeezed from between the teeth of said gears and delivering the same to both of said bearings, and means for deflecting lubricant from said pinion and delivering it to both of said bearings in either direction of rotation of said gearing.

15. In combination, a gear dipping in a lubricant bath, a meshing pinion, shafts for said gearing, bearings for said shafts, means for collecting lubricant squeezed from between the teeth of said gears and delivering the same to both bearings, and means for deflecting lubricant from said pinion and delivered it to both bearings, each of said means having different passage means leading therefrom to one bearing and passage means for the other bearing uniting in a common passage means leading to said bearing.

16. In a lubricating mechanism, a gear dipping in a lubricant bath, a meshing non-dipping gear, shafts for said gears, and means for lubricating the shaft bearings including means for collecting lubricant squeezed from between the teeth of said gearing and leading to the bearings of both shafts and means for collecting lubricant from said non-dipping gear having passages independent of those of said first mentioned collecting means and leading to the bearings of one shaft.

17. In a lubricating mechanism, a gear dipping in a lubricant bath, a meshing non-dipping gear, shafts for said gears, and means for lubricating the shaft bearings including a lubricating bearing for the shaft of said non-dipping gear having thereon means for collecting lubricant squeezed from between the teeth of said gearing and an independent means for collecting lubricant from said non-dipping gear in either direction of rotation thereof.

18. A lubricating bearing member adapted to collect lubricant squeezed out from between the teeth of intermeshing gearing having an underslung lubricant collecting lip and a transverse aperture leading from said lip to the bore, said bearing also having supplemental outlets, one leading longitudinally from said lip and the other transversely from said aperture.

19. In a lubricating mechanism, a gear dipping in a lubricant bath, a meshing non-dipping gear, shafts for said gears, and lubricating means for said shafts including a lubricating bearing for the non-dipping gear shaft supplying lubricant to both of said shafts and having a longitudinally extending upper trough communicating with its bore and a baffle at the inner end thereof engaging with lubricant on said non-dipping gear and positively feeding said lubricant longitudinally in said trough.

20. In a lubricating mechanism, a gear dipping in a lubricant bath, a meshing non-dipping gear, shafts for said gears, and lubricating means for said shafts including a lubricating bearing for the non-dipping gear shaft supplying lubricant to both of said shafts and having a longitudinally extending upper trough communicating with its bore and a baffle at the inner end thereof engaging with lubricant on said non-dipping gear and positively feeding said lubricant longitudinally in said trough in either direction of rotation of said gear.

21. A lubricating slip bearing having an upper open ended lubricating chamber communicating with the bearing bore and an abutment so located at the open end of said chamber and projecting longitudinally thereof as to be operative to divert lubricant supplied against one side of said abutment into said chamber through the open end thereof.

22. A lubricating slip bearing having an upper open ended lubricating chamber communicating with the bearing bore and an abutment so located between the sides of the open end of said chamber and projecting longitudinally thereof as to be operative to divert lubricant supplied against either side of said abutment into said chamber through the open end thereof.

23. A lubricating slip bearing having a chamber on its upper surface communicating with the bearing bore and provided with an open end and an abutment disposed substantially parallel to one of the walls of said chamber and longitudinally thereof substantially within the vertical limits thereof, said abutment extending into and beyond the open end of said chamber in such manner as to divert lubricant through the same.

24. A lubricating slip bearing having a longitudinally disposed open ended chamber communicating with the bearing bore and also having a deflector located substantially midway between and parallel to the walls of said chamber and longitudinally thereof substantially within the vertical limits thereof, said deflector extending lengthwise of said member beyond the open end thereof and adapted to engage a rotating member and, irrespective of the direction of rotation thereof, to divert lubricant therefrom into said chamber through said open end.

25. A lubricating bearing member adapted to collect lubricant squeezed out from between the teeth of intermeshing gearing having a projecting lubricant collecting lip and a transverse aperture leading through the bearing body to the bearing bore adjacent said lip.

26. A lubricating bearing member adapted to collect lubricant squeezed out from between the teeth of intermeshing gearing having an underslung lubricant collecting lip and a transverse aperture leading through the bearing body to the bearing bore and extending above and below the top of said lip.

27. A lubricating bearing member adapted to collect lubricant squeezed out from between the teeth of intermeshing gearing having a projecting lubricant collecting lip and a transverse aperture leading from said lip through the bearing body to the bearing bore, said member also having said bore enlarged adjacent said aperture.

28. A lubricating bearing member adapted to collect lubricant squeezed out from between the teeth of intermeshing gearing having an underslung lubricant collecting lip and a transverse aperture leading from said lip through the bearing body also having said bore enlarged adjacent supplemental outlets, one leading longitudinally from said lip and the other transversely from said aperture.

29. A lubricating bearing member having a projecting lubricant collecting lip and connected distributing passage means supplied thereby and having a lubricant wiper and connected lubricant distributing passage means independent of said lip and its connected passage means and supplied by said wiper.

30. A lubricating bearing member having a projecting lubricant collecting lip and connected distributing passage means supplied thereby and having a lubricant wiper and connected lubricant distributing passage means independent of said lip and its connected passage means and supplied by said wiper, said wiper forming a positive feeding means for its distributing passage means.

31. A lubricating bearing member having a projecting lubricant collecting lip and connected distributing passage means supplied thereby and having a lubricant wiper and connected lubricant distributing passage means independent of said lip and its connected passage means and supplied by said wiper, said wiper extending beyond its passage means substantially midway between the walls thereof.

32. A lubricating bearing member having a projecting lubricant collecting lip and connected distributing passage means supplied thereby and having a lubricant wiper operative in either direction of rotation of an adjacent rotating member and connected lubricant distributing passage means independent of said lip and its connected passage means and supplied by said scraper, said lip being located at one side of the bearing member and below the top thereof and said wiper being disposed on the top of the latter, and both said lip and wiper being so disposed within the limits of said bearing member as to permit longitudinal withdrawal thereof at will.

33. A lubricating bearing member provided with a flange intermediate its ends and a longitudinal trough on its top communicating with the bearing bore and also leading through said flange.

34. A lubricating bearing member provided with spaced flanges at one end and a longitudinal trough on its top having communicating portions on opposite sides of one of said flanges each communicating with the bearing bore.

35. A lubricating bearing member provided with spaced flanges at one end and a longitudinal trough on its top communicating with the bearing bore and leading through one of said flanges, said trough having an open end and a wiper supplying lubricant therethrough.

36. A lubricating bearing member provided with spaced flanges at one end and a longitudinal trough on its top communicating with the bearing bore and leading through one of said flanges, said trough having an open end and a wiper supplying lubricant therethrough and located substantially midway between the side walls of said trough and projecting beyond the open end thereof.

37. A lubricating bearing member having a transverse opening in its body at one end thereof leading to the bearing bore, and a longitudinal trough at its top leading from the same end thereof and having communication with the bearing bore, and a plurality of means for collecting lubricant, one supplying said opening and the other said trough.

38. A lubricating bearing member having a transverse opening in its body at one end communicating with the bearing bore, a longitudinal underslung trough communicating with said opening, and supplemental lubricating means including a wiper and a longitudinal trough on the bearing top receiving lubricant from said wiper at one end of the bearing and communicating with the bearing bore adjacent the opposite end of the latter from said opening.

39. In a lubricating mechanism, a gear dipping in a lubricant bath, a non-dipping gear meshing therewith, shafts for said gears, bearings for said shafts including a top trough on the bearing for said non-dipping gear, means for positively feeding lubricant from said non-dipping gear longitudinally into said trough, and means for supplying lubricant in said trough to the bore of a bearing for each shaft.

40. In a lubricating mechanism, a gear dipping in a lubricant bath, a non-dipping gear meshing therewith, shafts for said gears, bearings for said shafts including a top trough on the bearing for said non-dipping gear, means for positively feeding lubricant from said non-dipping gear longitudinally into said trough in either direction of rotation of said gear, and means for supplying lubricant in said trough to the bore of a bearing for each shaft.

41. A lubricating slip bearing having a lateral seating flange on its outer end and an elongated inner sleeve portion presenting a bore having a portion of enlarged diameter at its inner end and a communicating reduced portion leading to its outer end, said sleeve also having a top trough communicating with the bore and extending longitudinally substantially from end to end of said bearing, and a wiper delivering longitudinally into said trough.

42. A lubricating slip bearing having a laterally projecting portion on its outer end, a flange of smaller diameter projecting inward from the base of said portion, an elongated inner sleeve portion, said sleeve having a longitudinal trough in its top communicating with the bearing bore and an open inner end, and a longitudinal wiper delivering lubricant longitudinally into said open end between one side of the wiper and one wall of the trough.

43. A lubricating slip bearing member having seating means at its outer end, a longitudinal lubricant trough in its top communicating with the bearing bore and extending substantially from end to end thereof, a longitudinal wiper delivering longitudinally into the inner end of said trough, and cooperating seating means between the ends of said trough so disposed as to permit flow through the latter.

In testimony whereof I affix my signature.

JOHN W. GARDNER.

CERTIFICATE OF CORRECTION.

Patent No. 1,680,871.  Granted August 14, 1928, to

JOHN W. GARDNER.

It is hereby certified that error appears in the printed specification of the above numbered patent requiring correction as follows: Page 2, line 85, for the word "surface" read "surfaces; page 3, line 60, after the word "will" insert a comma; page 4, line 87, claim 15, for "delivered" read "delivering"; page 4, strike out present claim 18, lines 116 to 124 inclusive, and insert the following as claim 18:-

"In a lubricating mechanism, a gear dipping in a lubricant bath, a meshing non-dipping gear, shafts for said gears, and means for lubricating the shaft bearings including a lubricating bearing for the shaft of said non-dipping gear having thereon means for collecting lubricant squeezed from between the teeth of said gearing and an independent means for collecting lubricant from said non-dipping gear in either direction of rotation thereof, both of said means being so disposed within the lines of said bearing member as to permit longitudinal withdrawal of the latter."

page 5, strike out present claim 28, lines 85 to 94 inclusive, and insert the following as claim 28:-

"A lubricating bearing member adapted to collect lubricant squeezed out from between the teeth of intermeshing gearing have an underslung lubricant collecting lip and a transverse aperture leading from said lip to the bore, said bearing also having supplemental outlets, one leading longitudinally from said lip and the other transversely from said aperture."

and the said Letters Patent should be read with these corrections therein that the same may conform to the record of the case in the Patent Office.

Signed and sealed this 9th day of October, A. D. 1928.

(Seal)

M. J. Moore,
Acting Commissioner of Patents.